United States Patent [19]
Langer et al.

[11] Patent Number: 5,381,554
[45] Date of Patent: Jan. 10, 1995

[54] UNINTERRUPTED POWER SUPPLY (UPS) SYSTEM INTERFACING WITH COMMUNICATIONS NETWORK

[75] Inventors: Dale R. Langer; G. John Messer, both of Raleigh, N.C.

[73] Assignee: Exide Electronics, Raleigh, N.C.

[21] Appl. No.: 196,414

[22] Filed: Feb. 15, 1994

Related U.S. Application Data

[62] Division of Ser. No. 980,650, Nov. 24, 1992, Pat. No. 5,319,571.

[51] Int. Cl.6 .......................... G11C 7/00; G06F 11/00; G06F 1/32
[52] U.S. Cl. .................................. 395/750; 364/492; 371/66; 307/38; 307/66
[58] Field of Search .................. 395/750; 364/492; 371/66; 307/38, 66

[56] References Cited

U.S. PATENT DOCUMENTS

| | | | |
|---|---|---|---|
| 4,241,261 | 12/1910 | Ebert, Jr. | 307/45 |
| 4,551,812 | 11/1985 | Gurr et al. | 364/492 |
| 4,611,289 | 9/1986 | Coppola | 364/492 |
| 4,709,318 | 11/1987 | Gephart et al. | 363/37 |
| 4,757,505 | 7/1988 | Marrington et al. | 371/66 |
| 4,789,790 | 12/1988 | Yamanaka | 307/87 |
| 4,841,474 | 6/1989 | Zandveld et al. | 364/900 |
| 4,857,756 | 8/1989 | Haneda | 307/66 |
| 4,868,832 | 9/1989 | Marrington et al. | 395/750 |
| 4,885,523 | 12/1989 | Koenck | 320/21 |
| 5,019,717 | 5/1991 | McCurry et al. | 307/66 |
| 5,163,153 | 11/1992 | Cole et al. | 395/750 |
| 5,177,371 | 1/1993 | Faulk | 371/66 |

*Primary Examiner*—Allen R. MacDonald
*Assistant Examiner*—George Davis
*Attorney, Agent, or Firm*—Woodcock Washburn Kurtz Mackiewicz & Norris

[57] ABSTRACT

There is a provided a system of one or more uninterrupted power supply (UPS) units, each UPS unit having distributed processing system and a network interface for interfacing with a local area network, the network providing a communication between the one or more UPS devices and also to loads powered by such UPS devices. In one embodiment having a plurality of UPSs, one of the UPSs is a main upstream UPS which is in communication with each down stream UPS to which it supplies supplemental power and which in turn supply power to respective loads. In another embodiment the UPS supplies power to a plurality of prioritized loads, and is in communication with each such load over a network and also controls power distribution to each such load through a power distribution module (PDM).

3 Claims, 5 Drawing Sheets

UNINTERRUPTED POWER SUPPLY (UPS) SYSTEM INTERFACING WITH COMMUNICATIONS NETWORK

This is a division of application Ser. No. 07/980,650, filed Nov. 24, 1992, U.S. Pat. No. 5,319,571.

BACKGROUND OF THE INVENTION

1. Field of the Invention

This invention relates to a system for communicating to or from one or more UPS devices through a network and, more particularly to a distributed processing system wherein each UPS is connected directly through a network interface unit to a local area network (LAN).

2. Description of the Prior Art

The uninterrupted power supply (UPS) has become indispensable for many modern day power loads. Particularly with respect to computers and other forms of data processing devices, it is of utmost importance that power be uninterrupted so that automated systems do not go down, data is not lost, etc. UPS devices are thus in widespread use for a variety of loads, but are particularly critical to the computer or processor environment.

Of particular importance to this invention is the situation where power on the utility line is lost for sufficient duration that the load must shut down. As is known, in the event of power loss the UPS provides uninterrupted power that looks like utility power, so that the load is unaffected. However, for a given load, any UPS or package of UPSs will be able to maintain power to the load for only a limited amount of time, dependent upon the energy stored in its batteries. In the computer situation, when and if power has been lost for a period of time approaching the total battery time which the UPS can supply, steps must be taken to shut down the load in an optimized manner. For instance, an idle printer or an idle tape drive or terminal could be powered down to conserve the battery for the main frame. Intelligence is thus needed to continuously monitor the time of power loss, and perform sequential preprogrammed load shedding of the computer hardware on the network, in order to maintain necessary operations for as long as possible during a power outage, and to download data onto a storage medium which is not affected by power loss.

The prior art has recognized the need to communicate between a network to which a number of computer loads are attached, ant each UPS that is being used in connection with such computers. However, the direction of the solution has been to provide software at the computer, or workstation, which simply enables it to receive alarm and status notification from the UPS. The prior art provides no system or arrangement for sending control signals from an UPS to any other UPS. Further, the prior art does not provide the UPS with the capability of turning itself off or on, or of providing programmed sequential load shedding.

Referring to FIG. 1, there is shown a simplified diagram of the prior art approach to communications involving a network, a plurality of nodes (some of which may be workstations), and a UPS associated with each node. In this arrangement, each UPS is shown powering the load at a network node, although more complicated arrangements are possible. The network nodes are tied together by an appropriate cable, using "EtherNet." See IEEE 802.3 10 Base 5 (thick wire) and 10 Base 2 (thin wire) standards. The EtherNet transports packets of data between nodes, and each workstation uses "Proxy Agent" software to communicate with its respective UPS. The UPS can provide its workstation with alarm and status notification, over the RS-232 link between them. However, not all nodes are workstations, and there is no capability for sending any control or sequence signals from a UPS to any other UPS or directly to any other computer on the network. Further, if any given UPS provides the power to one or more downstream UPSs, the upstream UPS cannot send shutdown instructions to such a downstream UPS. The system is thus limited, and each UPS is without its own capacity to receive and generate controls for itself or other UPSs.

SUMMARY OF THE INVENTION

It is a primary object of this invention to provide an interconnected system of UPS units, or a single UPS tied to plural loads, each UPS unit having a network interface board or card for interfacing with a communications network whereby each such UPS is an effective node that communicates directly with the local network. In one preferred embodiment, a large upstream UPS powers each of the other UPS devices, has means to instruct each downstream UPS when AC power has been lost, and to control the timing of shutdown of each downstream device. Each UPS network interface means has a microprocessor and associated memory, providing for distributed control of shutdown, thereby maintaining power to priority loads for the maximum available time, and enabling downloading of critical data into safe storage. In another embodiment, a single UPS communicates through the network to plural loads in order to provide programmed load shedding in event of utility power loss.

DESCRIPTION OF THE PREFERRED EMBODIMENTS

Figure 2:
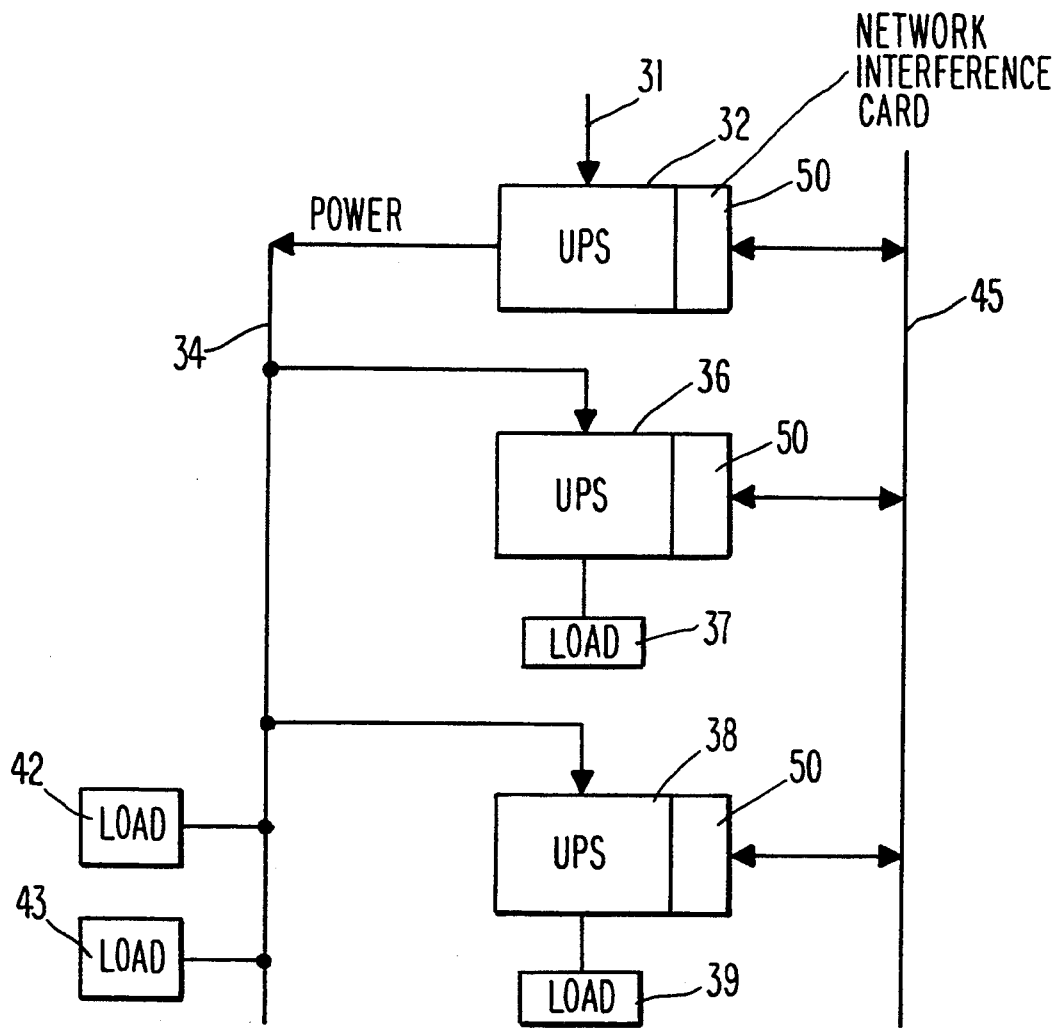
FIG. 2 is a block diagram of one embodiment of the system of this invention, whereby each UPS has its own means of interfacing with a network, thereby providing for distributed control of power delivery to respective loads.

Referring now to FIG. 2, there is shown a simplified block diagram of one of the preferred embodiments of this invention. In this system, a plurality of loads receive power from respective downstream UPS units, which downstream UPS units in turn receive supplemental power from an upstream, larger power UPS. As seen in FIG. 2, the utility line 31 provides power to a first, or upstream UPS 32. UPS 32 provides uninterrupted power on line 34, which line provides supplemental power to downstream UPS devices 36, 38, etc. Each downstream UPS provides power to a respective load, illustrated at 37 and 39. In this arrangement, each downstream UPS has its own battery supply, and normally receives power from upstream UPS 32 instead of directly from the utility. In the case of loss of power on the utility line, each downstream UPS can continue to provide power to its load derived both from its own battery, and also battery-generated power coming from upstream UPS 32. In addition, UPS 32 may independently supply one or more loads, as illustrated at 42, 43.

Figure 1:
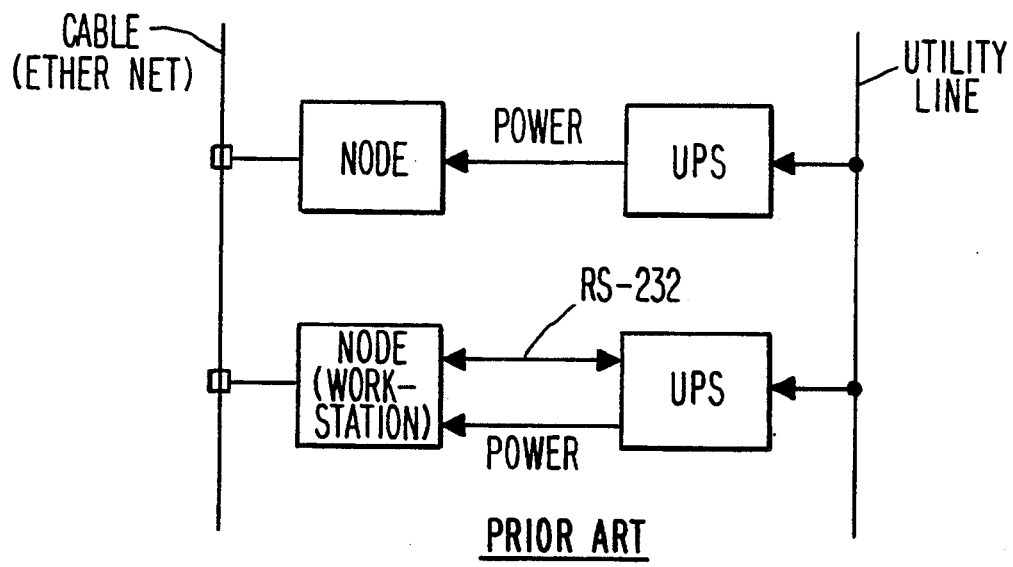
FIG. 1 is a simplified block diagram illustrating a prior art arrangement.

Still referring to FIG. 2, a network 45, suitably utility "EtherNet", interconnects the UPS devices (and may also connect to the loads). Each UPS device has a network interface card (NIC) or network interface board 50, which interconnects between the main conventional UPS controls and network 45. By having an NIC 50 in each UPS, the system is provided with distributed processing capability, whereby each UPS can communicate with the others, and thus can make logic decisions based upon received information as well as on the basis of its own status readings. By this arrangement, the main or upstream UPS 32 can tell each downstream UPS when ac power has been lost and its battery status, whereby each downstream UPS can intelligently control timing of its own shutdown. Contrasted with the prior art arrangement of FIG. 1, in this system each UPS is a node that communicates directly with the network.

Figure 3:
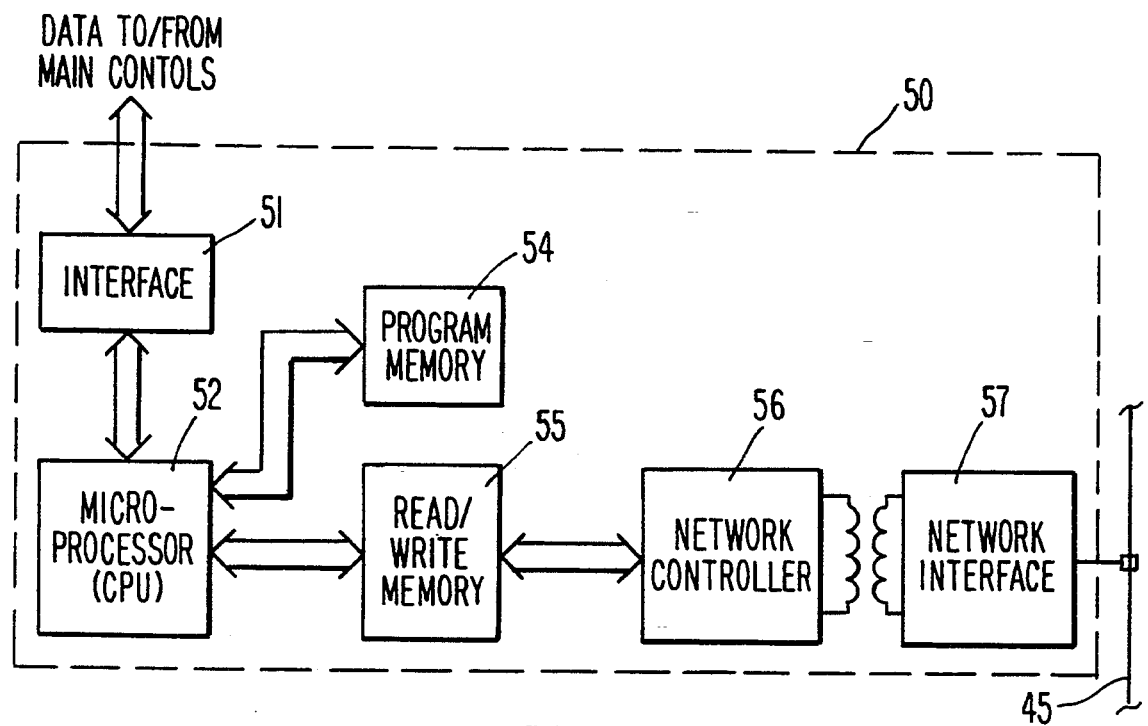
FIG. 3 is a block diagram of a network interface board, or card, as employed in each UPS in accordance with this invention.

Referring now to FIG. 3, there is illustrated a block diagram of the NIC 50. The network cable 45 is connected to the network interface 57, a standard commercially available IC, for providing I/O between the UPS and the network. The network interface is coupled to network controller 56, also a commercially available IC. Controller 56 handles low level data link control, e.g., error correction, decoding of data coming off the network, encoding data for placing on the network, etc. Interface block 51, also a standard available circuit, interconnects between the main UPS controls and a microprocessor 52. Microprocessor 52 provides the processing capability required for the decision routines as discussed below. Microprocessor 52 is interconnected with program memory illustrated at 54, and read/write memory 55 which is shown interconnected between the microprocessor 52 and network controller 56.

Figure 4A:
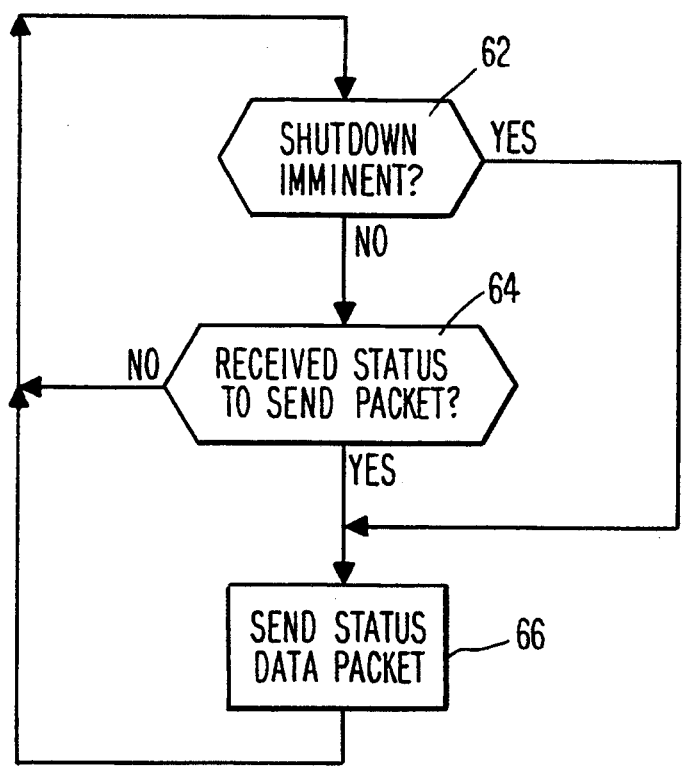
FIG. 4A is a simplified flow diagram illustrating the basic control decisions carried out in the upstream main UPS of the system of FIG. 2.
Figure 4B:
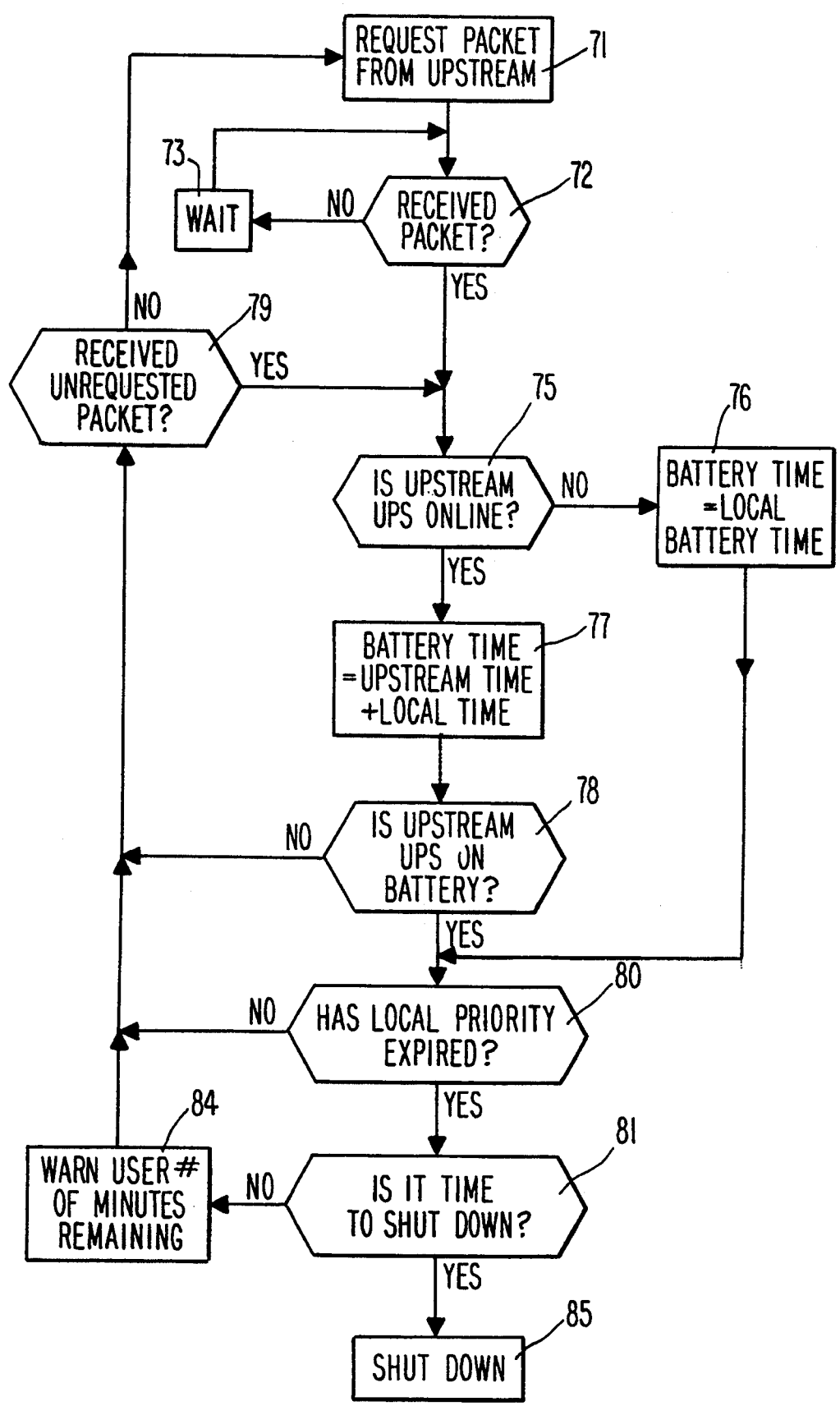
FIG. 4B is a flow diagram illustrating the primary decisions made in each downstream UPS of the system of FIG. 2.

Referring now to FIGS. 4A and 4B, there are shown UPS flow diagrams for an embodiment of the invention directed to controlling UPS shutdown for the system of FIG. 2. FIG. 4A is flow diagram for the upstream UPS, while FIG. 4B illustrates a downstream UPS shutdown control flow diagram. The software for carrying out these routines is suitably stored in program memory 54. It is to be understood that these flow diagrams are illustrative only of a control routine for the system embodiment having a large upstream UPS and plural smaller downstream UPSs connected thereto.

Referring to FIG. 4A, at 62 the processor determines whether shutdown is imminent. Shutdown would be imminent, for example, in the case of utility power loss and low battery simultaneously occurring. Alternately, UPS 32 may have received a communication from network 45 directing it to shutdown. If shut, down is not imminent, the program branches to block 64, and determines whether it has received a request from one of the other UPS units to send a packet of data. Such a packet of data is referred to as a status data packet, and contains UPS state status as well as battery time remaining. If there has been no such request, the UPS recycles to block 62. If there has been such a request, the program branches directly to block 66, and sends a status data packet onto the network.

Referring now to FIG. 4B, at block 71 the downstream UPS can request a packet from the upstream UPS. Following this, at block 72 it is determined whether a packet has been received. If no, the routine waits at 73, and then again determines whether it has been received. Once the packet has been received, the program branches to block 75, where it is determined whether the upstream UPS is on line, i.e., is it putting power out. If no, then the downstream UPS knows that it is on its own, and it branches to block 76 where its effective battery time is set equal to its own local battery time. Following this, the program branches to block 80. If the answer at block 75 is yes, i.e., the upstream UPS is on line, the program first branches to block 77, and sets effective battery time to be equal to the upstream time plus local time, and then to block 78. At block 78, it is determined whether the upstream UPS is on battery, an indication that power has been lost. If no, the program branches to block 79 and determines whether the UPS has received an unrequested packet. If yes, the program branches back to block 75; if no, it goes back to block 71. If the answer at 78 is yes, the routine proceeds to block 80, to determine whether its local priority has expired. The local priority is programmed into each UPS, and is the determinant of how long it can continue to receive supplemental power from the upstream UPS. If the local priority has not expired, the program branches to block 79. If it has expired, the program proceeds to block 81, where it is determined whether it is time to shut down the downstream UPS. If no, the program branches to block 84, where a warning is given to the user of the number of minutes remaining, i.e., how much longer such UPS will continue to provide power to its load. If at 81 it is determined that it is time to shut down, the control branches to block 85 where shutdown is undertaken in accordance with a predetermined program. The shutdown routine for each UPS may be simple or complex, depending upon the loads that it is supplying. Thus, for example, each UPS in turn may prioritize its respective loads and shut them down in a predetermined manner.

Figure 5:
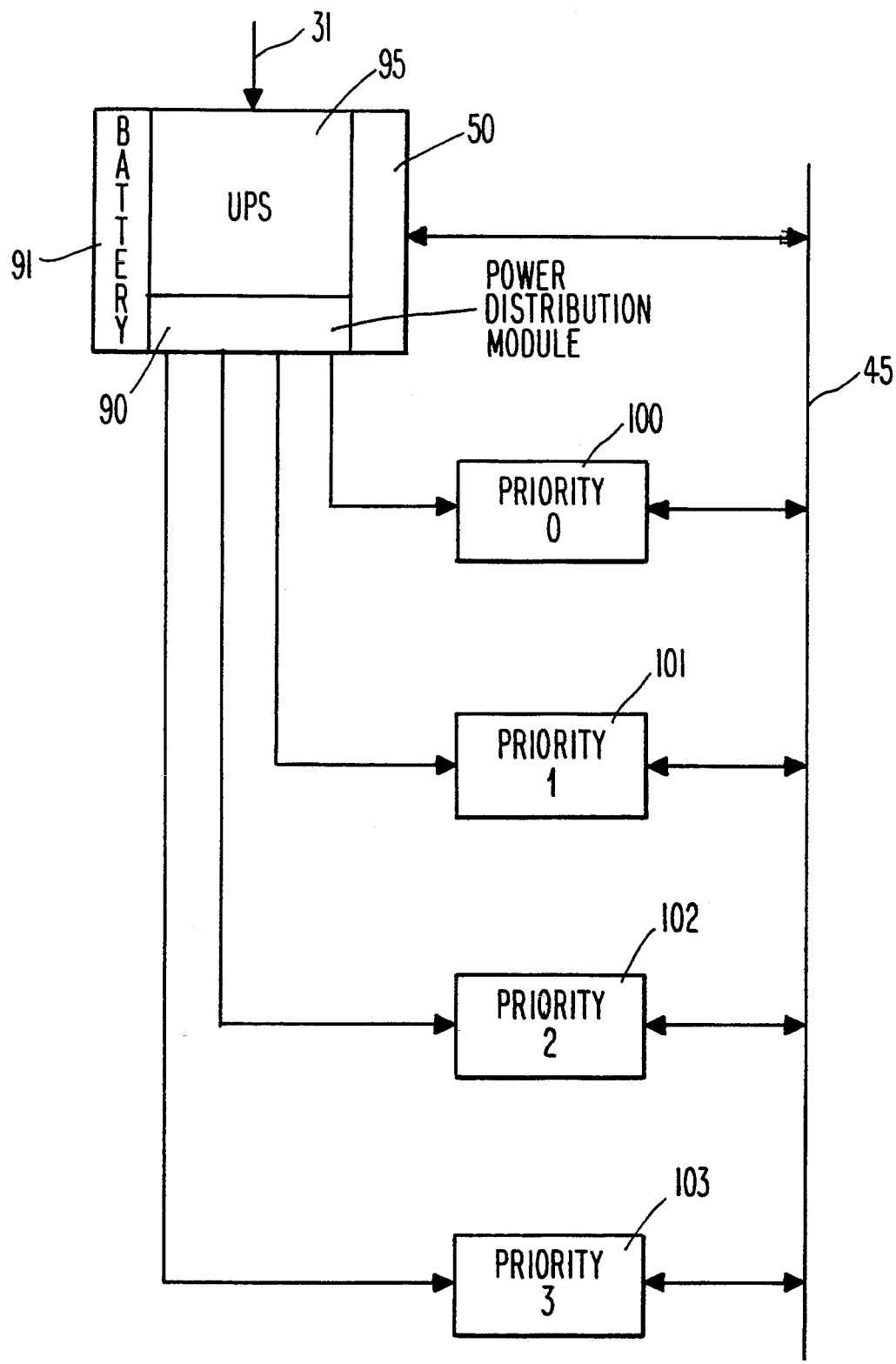
FIG. 5 is a block diagram of another embodiment of the system of this invention, whereby a UPS communicates with plural loads over an LAN mode to achieve prioritized load shedding in the event of power loss.

Referring now to FIG. 5, there is shown another embodiment whereby a UPS is equipped with an NIC for controlling downloading of a plurality of loads to which it is supplying power. In this arrangement, a single UPS 95 is shown receiving power from the power line 31. The UPS has a battery 91 and an NIC 50. Associated with it is a power distribution module, PDM, 90. The PDM contains logic controlled breakers which allow for selective load shedding of the various loads supplied by UPS 95. In the arrangement illustrated, UPS 95 supplies power to loads 100–103, having priorities 0, 1, 2 and 3 respectively. The assigned priority for each load determine how long it will receive power from the UPS in the event of shutdown, as is illustrated below in connection with the discussion of the flow diagram for controlling shutdown. In this arrangement, the NIC 50 communicates with the network, e.g., EtherNet 45, which in turn communicates with each of loads 100–103. In this system, each load, or node on the network, is an intelligent device, e.g., a computer. This embodiment of the invention provides for communication between the UPS and each computer, and incorporates the ability to perform sequential load shedding of hardware on the network in order to keep the high priority loads operational for as long as possible during a power outage. This embodiment thus provides for totally automatic shutdown, as well as restart capability, by employing sequential power switching through the PDM and the network commands. It is also noted that with this arrangement an instruction to shut down any one of the computers for any given reason, can be communicated from an external node to the EtherNet, and acted on by the UPS.

Figure 6:
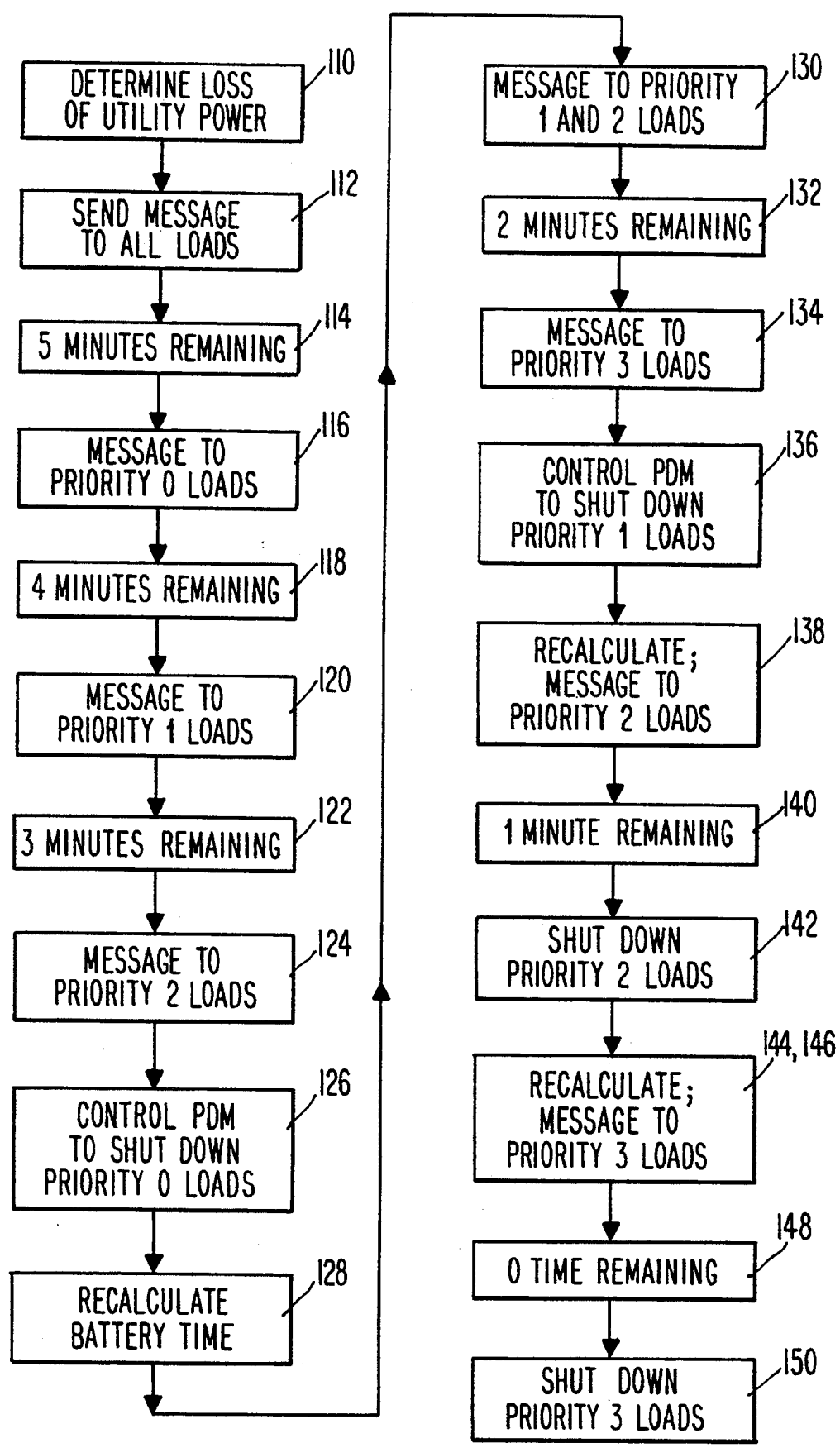
FIG. 6 is a simplified flow diagram of the routine in the UPS of FIG. 5, for controlling prioritized load shedding.

Referring now to FIG. 6, there is shown a flow diagram for carrying out an automatic shutdown sequence. In this flow diagram, it is assumed that there are four loads, having power protection priorities in the range of 0 to 3, with 0 being the lowest priority and 3 being the highest priority. It is, of course, understood that the invention is not limited to the number of loads or the complexity of the shutdown sequence, and this flow diagram is illustrative.

During quiescent operation, the UPS waits and monitors the power line to determine whether there is loss of utility power. If such power loss is determined at block 110, the UPS routine proceeds to block 112 and sends a message to all loads, via network 45, indicating that the UPS is now running on battery. Assuming that the UPS battery time is specified at six minutes, the program then waits for one minute to pass, such that five minutes of battery time is remaining (114). When this is determined, at 116 the UPS sends a message via the network to all lowest priority (priority level 0) devices, warning that they will shut down in two minutes. The computer that receives this information can respond intelligently, by in turn selectively shutting down portions which are not in use or which are lower priority. Following this, at block 118, the UPS waits until four minutes of battery time remain, at which time it proceeds to block 120 and sends a warning message via the network to all priority 1 devices that they will be shut down in two minutes. At 122, the UPS waits until only three minutes of battery time remain, at which time the UPS sends a warning message via the network to all priority level 2 devices that they will shut down in two minutes, as seen at 126. At the same time, the UPS opens the breaker or breakers that feed the priority level 0 devices. This may, and probably should, cause the predicted battery time remaining to increase, due to the decreased load being handled by the UPS. Subsequently, at block 128, the UPS recalculates the battery time, and at 130 broadcasts revised warnings to priority 1 devices, e.g., advises if the new predicted battery time is greater than five minutes.

Following this, the UPS waits until two minutes of battery time remain, as shown at block 132. At this time, a warning message is sent via the network to all priority level 3 devices, advising that they will be shut down in two minutes, as seen at block 134. At the same time, the UPS controls the PDM to open the breaker or breakers that feed the priority level 1 devices, as seen at 136. Following this, at 138, the UPS recalculates remaining battery time, and sends any revised time to the level 2 devices. At 140, the UPS waits until only one minute is remaining, and then at 142 causes the PDM to open the breaker or breakers that feed the priority level 2 devices. Again, this may cause the predicted remaining battery time to increase, so this value is recalculated at 144. A message is sent to all level three devices containing the recalculated time, as seen at 146. The UPS then waits at 148 until a determination that 0 battery time is left, at which time it removes power from all remaining loads, including the priority 3 level devices, as shown at 150.

We claim:

1. A system comprising an uninterrupted power supply (UPS), a plurality of loads having predetermined priorities for maintenance of power thereto, a network for transmitting data to and from each of said loads and said UPS, and bar connection means for connecting power separately from said UPS to each of said loads, said UPS having network interface means for interfacing with said network, said network interface means further comprising processor means for processing data and control signal generating means for generating control signals for controlling connection of power to each of said loads, said processor means comprising first means for generating messages to each of said loads wherein said messages concern time remaining for receipt of power by such load, and second means for generating shutdown signals and connecting said shutdown signals to said control signal generating means for controlling prioritized shutdown of said loads.

2. The system as described in claim 1, wherein said control signal generating means comprises a power distribution module (PDM) for controlling distribution of power to said loads.

3. The system as described in claim 1, wherein said processor means comprises storage means for storing data representative of the predetermined priorities of said plurality of loads.

* * * * *